United States Patent
Sugaya (10) Patent No.: US 10,913,533 B2
(45) Date of Patent: Feb. 9, 2021

(54) REMOTE CONTROL SYSTEM, REMOTE CONTROL METHOD AND PROGRAM

(71) Applicant: OPTiM Corporation, Saga (JP)

(72) Inventor: Shunji Sugaya, Tokyo (JP)

(73) Assignee: OPTIM CORPORATION, Saga (JP)

(*) Notice: Subject to any disclaimer, the term of this patent is extended or adjusted under 35 U.S.C. 154(b) by 0 days.

(21) Appl. No.: 16/467,603

(22) PCT Filed: Dec. 12, 2016

(86) PCT No.: PCT/JP2016/086866
§ 371 (c)(1),
(2) Date: Jun. 7, 2019

(87) PCT Pub. No.: WO2018/109796
PCT Pub. Date: Jun. 21, 2018

(65) Prior Publication Data
US 2020/0070975 A1    Mar. 5, 2020

(51) Int. Cl.
*B64C 39/02* (2006.01)
*B64C 27/08* (2006.01)
*B64D 47/08* (2006.01)

(52) U.S. Cl.
CPC ............ *B64C 39/024* (2013.01); *B64C 27/08* (2013.01); *B64D 47/08* (2013.01);
(Continued)

(58) Field of Classification Search
CPC . B64C 39/024; B64C 27/08; B64C 2201/027; B64C 2201/146; B64D 47/08; G08C 2201/32; G08C 2201/91
(Continued)

(56) References Cited

U.S. PATENT DOCUMENTS 9,041,828 B2 * 5/2015 Kaneda .............. H04N 5/23222
348/222.1
9,674,485 B1 * 6/2017 Sugaya .................... H04N 7/15
(Continued)

FOREIGN PATENT DOCUMENTS

EP        2957945 A1 * 12/2015  ............. G02B 27/58
JP       2011-254711      12/2011
(Continued)

OTHER PUBLICATIONS

Marius et al., "Virtual Environment Stereo Image Capture Using the Unreal Development Kit," 2014, Publisher: IEEE.*
(Continued)

*Primary Examiner* — Tuan C To
(74) *Attorney, Agent, or Firm* — Lex IP Meister, PLLC (57) ABSTRACT

A control target device 30 is, for example, an agricultural machine for performing various processes such as watering, additional fertilization, agrochemical spreading, and harvesting on a plant grown in a field. A moving image-capturing device 20 is a device that is movable and has an image-capturing function, and is, for example, a rotary-wing aircraft called a drone or a multicopter. A remote control device 10 analyzes an image of the field captured by the moving image-capturing device 30, determines what process should be performed on the plant according to the analysis result, and instructs the control target device 30 to perform the determined process.

11 Claims, 6 Drawing Sheets

(52) U.S. Cl.
CPC .. *B64C 2201/027* (2013.01); *B64C 2201/146* (2013.01); *G08C 2201/32* (2013.01); *G08C 2201/91* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 9,870,609 | B2* | 1/2018 | Kompalli | G06T 7/0002 |
| 10,254,530 | B2* | 4/2019 | Miyoshi | G06K 9/52 |
| 2006/0126952 | A1* | 6/2006 | Suzuki | H04N 19/61 |
| | | | | 382/233 |
| 2006/0173918 | A1* | 8/2006 | Nakase | H04N 1/00458 |
| 2006/0268122 | A1* | 11/2006 | Iwasaki | H04N 1/32048 |
| | | | | 348/231.3 |
| 2007/0077025 | A1* | 4/2007 | Mino | G06F 16/5838 |
| | | | | 386/241 |
| 2008/0240493 | A1* | 10/2008 | Yoda | H04N 1/00188 |
| | | | | 382/100 |
| 2009/0317001 | A1* | 12/2009 | Sakai | G06K 9/00228 |
| | | | | 382/218 |
| 2011/0007185 | A1* | 1/2011 | Yonaha | H04N 5/2356 |
| | | | | 348/239 |
| 2011/0007186 | A1* | 1/2011 | Yonaha | H04N 5/2352 |
| | | | | 348/239 |
| 2013/0194387 | A1* | 8/2013 | Hatakeyama | H04N 5/3572 |
| | | | | 348/46 |
| 2015/0058740 | A1 | 2/2015 | Asahi | |
| 2015/0092052 | A1* | 4/2015 | Shin | G06K 9/00771 |
| | | | | 348/143 |
| 2015/0310599 | A1* | 10/2015 | Yamamoto | G06T 7/66 |
| | | | | 348/94 |
| 2015/0356727 | A1* | 12/2015 | Urano | G06T 1/0007 |
| | | | | 382/149 |
| 2016/0004914 | A1* | 1/2016 | Park | G06K 9/00771 |
| | | | | 382/209 |
| 2016/0055398 | A1* | 2/2016 | Ishiyama | G06K 9/036 |
| | | | | 382/190 |
| 2016/0174945 | A1* | 6/2016 | Oh | A61B 8/4405 |
| | | | | 382/131 |
| 2016/0379349 | A1* | 12/2016 | Hisamoto | H04N 9/045 |
| | | | | 382/261 |
| 2017/0064203 | A1* | 3/2017 | Kikuta | G06T 3/4038 |
| 2017/0102903 | A1* | 4/2017 | Nagasawa | G06F 3/1222 |
| 2017/0352100 | A1* | 12/2017 | Shreve | G06K 9/00664 |
| 2018/0197052 | A1* | 7/2018 | Yanson | G06K 19/06037 |

FOREIGN PATENT DOCUMENTS

| | | | | |
|---|---|---|---|---|
| JP | 2014-194601 | | 10/2014 | |
| JP | 2016-131517 | | 7/2016 | |
| JP | 2019032887 | A * | 2/2019 | |
| WO | 2013/137191 | | 9/2013 | |
| WO | WO-2015045439 A1 * | 4/2015 | | H04N 21/4126 |
| WO | WO-2016165298 A1 * | 10/2016 | | G06F 16/51 |

OTHER PUBLICATIONS

Xinguo et al., "A Novel Data Fusion Method Applied in Radar Imaging Matching Position," 2012, Publisher: IEEE.*
Jun-Jun et al., "A new Point Matching Method Based on Position Similarity," 2005, vol. 8, Publisher: IEEE.*

* cited by examiner

| Time/date | Position data | Image data | Processing target position data | Analysis result | Process |
|---|---|---|---|---|---|
| 2016/11/15 | N1E1, N2E2 ... | data01 | n1e1~n4e4 | Pest occurrence symptom | Agrochemical spraying |
| ... | ... | ... | ... | ... | ... |
| ... | ... | ... | ... | ... | ... |
| ... | ... | ... | ... | ... | ... |

FIG. 5

| Condition of analysis result | Process |
|---|---|
| Pest occurrence symptom | Agrochemical spraying |
| Water deficiency symptom | Watering |
| Fertilizer deficiency symptom | Additional fertilization |
| Growth completion symptom | Harvesting |
| ... | ... |
| ⋮ | ⋮ |

REMOTE CONTROL SYSTEM, REMOTE CONTROL METHOD AND PROGRAM

TECHNICAL FIELD

The present invention relates to a remote control system, a remote control method and a program.

BACKGROUND ART

Various techniques have been developed to support human work. For example, as a technique for supporting agricultural work, Patent Document 1 a system that includes a plurality of agricultural machines 2 which are movable and perform agricultural work, a data collecting device 3 which collects agricultural work data in each agricultural machine 2 and transmits the data to the outside, and a plurality of movable portable terminals 4 which receive the agricultural work data transmitted from the collecting device 3 and transmit the data to the server 5. The agricultural work data accumulated in the server 5 is used by an agricultural worker to create a management plan by creating a daily work report, making a work plan, or graphing the agricultural work result of each field.

PRIOR ART DOCUMENT

Patent Document

Patent Document 1: Japanese Patent Application Publication No. 2014-194601

SUMMARY OF THE INVENTION

Technical Problem

For example, in the technology described in Patent Document 1, it is entrusted to the agricultural worker to determine what kind of agricultural work to be performed and when. On the other hand, an object of the present invention is to make it possible to determine whether or not to perform various processes, for example, such as agricultural work without entrusting it to humans.

Technical Solution

The present invention provides a remote control system including an acquisition unit that acquires image data indicating an image captured by an image-capturing device and position data indicating a position of the image, a storage unit that stores a condition regarding an analysis result of the image data and a process to be performed by a control target device in association with each other, a determination unit that analyzes the acquired image data and determines whether the analysis result matches the stored condition, and an instruction unit that, when the analysis result matches the stored condition, instructs the control target device to perform the process associated with the condition in an area based on the acquired position data.

The image-capturing device may be a moving device that is movable.

The remote control system may further include a movement control unit that controls movement of the image-capturing device.

The movement control unit may control the movement of the image-capturing device in accordance with a type of an animal or plant included in the area where the process is performed.

The movement control unit may control the movement of the image-capturing device in accordance with the process, and the analysis unit may determine whether the analysis result matches the condition that is stored in association with the process.

The control target device may be the moving device.

The area based on the acquired position data may be an area that does not include the position indicated by the position data, and may be an area having a predetermined positional relationship with the position indicated by the position data.

The remote control system may further include a history storage unit that stores, as a process history, the instructed process and the area where the process has been performed, and the instruction unit may determine a process to be instructed to the control target device based on the stored processing history.

The instruction unit may determine a process to be instructed to the control target device based on information related to a natural environment at the position of the image before a time when the image is captured.

Further, the present invention provides a remote control method including acquiring image data indicating an image captured by an image-capturing device and position data indicating a position of the image, in a storage unit that stores a condition regarding an analysis result of the image data and a process to be performed by a control target device in association with each other, determining whether an analysis result of the acquired image data matches the stored condition, and when the analysis result matches the stored condition, instructing the control target device to perform the process associated with the condition in an area based on the acquired position data.

Furthermore, the present invention provides a program for causing one or more computers to execute acquiring image data indicating an image captured by an image-capturing device and position data indicating a position of the image, in a storage unit that stores a condition regarding an analysis result of the image data and a process to be performed by a control target device in association with each other, determining whether an analysis result of the acquired image data matches the stored condition, and when the analysis result matches the stored condition, instructing the control target device to perform the process associated with the condition in an area based on the acquired position data.

Effects of the Invention

According to the present invention, it is possible to determine whether or not to perform a process without entrusting it to humans.

DESCRIPTION OF REFERENCE NUMBERS

1: remote control system, 10: remote control device, 11: movement control unit, 12: acquisition unit, 13: storage unit, 14: determination unit, 15: instruction unit, 16: history storage unit, 20: moving image-capturing device, 21: movement unit, 22: image-capturing unit, 23: transmission unit, 24: position detection unit, 30: control target device, 31: processing unit, 90: network, 101: CPU, 102: RAM, 103: ROM, 104: auxiliary storage device, 105: communication IF, 201: CPU, 202: RAM, 203: ROM, 204: auxiliary storage device, 205: communication IF, 206: camera, 207: sensor, 2081: rotation mechanism.

DETAILED DESCRIPTION OF THE EMBODIMENTS

1. CONFIGURATION

Figure 1:
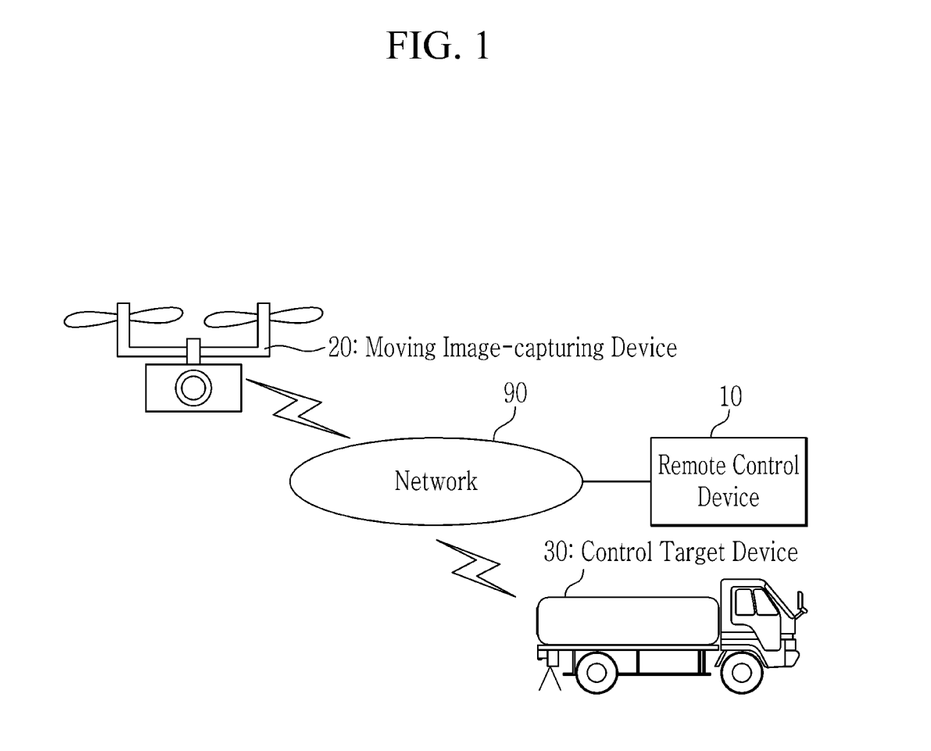
FIG. 1 is a diagram exemplifying an overview of a remote control system 1 according to an embodiment of the present invention.

FIG. 1 is a diagram exemplifying an overview of a remote control system 1 according to an embodiment of the present invention. The remote control system 1 includes a remote control device 10, a moving image-capturing device 20, a control target device 30, and a network 90 communicably connecting these devices 10 to 30. The network 90 is, for example, a LAN (Local Area Network), a WAN (Wide Area Network), or a combination thereof, and may include a wired section or a wireless section. The control target device 30 is, for example, an agricultural machine for performing various processes such as watering, additional fertilization, agrochemical spreading, and harvesting on a plant grown in a field. The moving image-capturing device 20 is a device that is movable and has an image-capturing function, and is a rotary-wing aircraft called a drone or a multicopter in the present embodiment. The moving image-capturing device 20 flies above the field according to an instruction of the remote control device 10, and captures an image of a plant cultivated in the field. The remote control device 10 analyzes the image captured by the moving image-capturing device 20, determines what process should be performed on the plant according to the analysis result, and instructs the control target device 30 to perform the determined process. The control target device 30 performs the instructed process automatically or in accordance with an operation of an agricultural worker.

Figure 2:
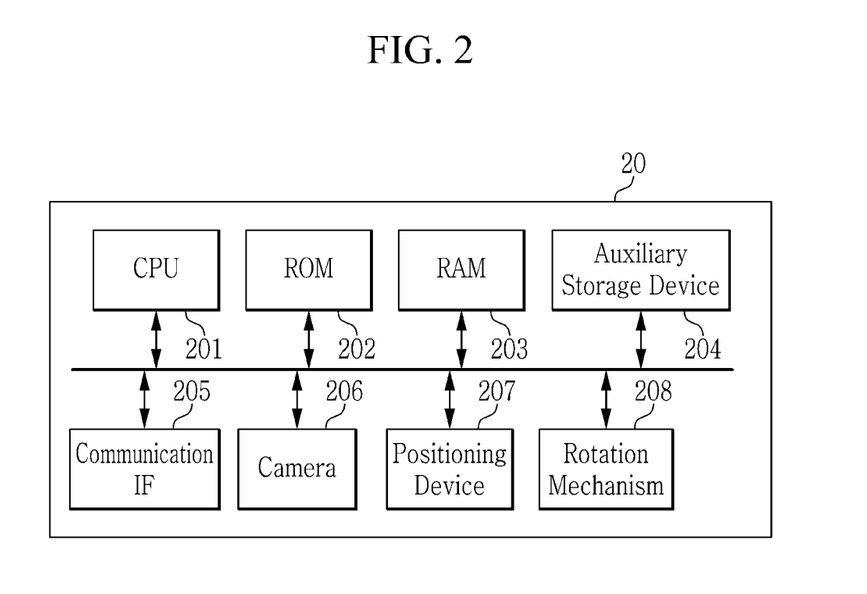
FIG. 2 is a diagram exemplifying a hardware configuration of a moving image-capturing device 20.

FIG. 2 is a diagram exemplifying a hardware configuration of a moving image-capturing device 20. The moving image-capturing device 20 includes a CPU 201 (Central Processing Unit), a ROM (Read Only Memory) 202, a RAM (Random Access Memory) 203, an auxiliary storage device 204, a communication IF 205, a camera 206, a sensor 207, and a rotation mechanism 208. The CPU 201 is a processor that performs various operations. The RAM 202 is a volatile memory that functions as a work area when the CPU 201 executes a program. The ROM 203 is, for example, a non-volatile memory that stores a program and data used for starting the moving image-capturing device 20. The auxiliary storage device 204 is, for example, a non-volatile storage device such as a hard disk drive (HDD) or a solid state drive (SSD) and stores a program and data used in the moving image-capturing device 20. The CPU 201 executes the program so that the moving image-capturing device 20 functions as a computer device and functions shown in FIG. 6 to be described below are implemented. The communication IF 205 is an interface that performs communication via the network 90 in accordance with a predetermined communication standard. The communication standard may be a wireless communication standard or a wired communication standard. The camera 206 captures an image of, for example, a space vertically below the moving image-capturing device 20, and generates image data indicating the captured image. The positioning device 207 is, for example, a GPS (Global Positioning System) unit, and detects a position of the moving image-capturing device 20. The rotation mechanism 208 is means for generating buoyancy in the moving image-capturing device 20, and includes a propeller, a shaft, a motor, and other driving mechanisms.

Figure 3:
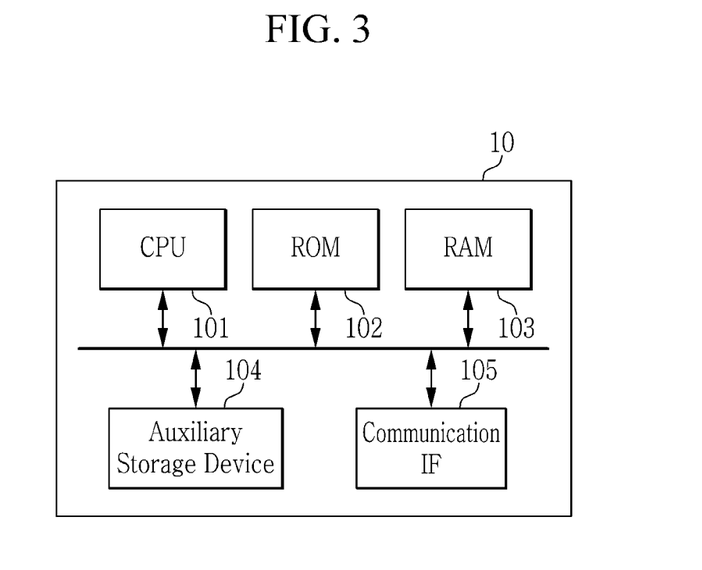
FIG. 3 is a diagram exemplifying a hardware configuration of a remote control device 10.

FIG. 3 is a diagram exemplifying a hardware configuration of a remote control device 10. The remote control device 10 is a computer device including a CPU 101, a ROM 102, a RAM 103, an auxiliary storage device 104, and a communication IF 105. The CPU 101 is a processor that performs various operations. The RAM 102 is a volatile memory that functions as a work area when the CPU 101 executes a program. The ROM 103 is a non-volatile memory that stores, for example, a program and data used for starting the remote control device 10. The auxiliary storage device 104 is, for example, a non-volatile storage device such as an HDD or an SSD and stores a program and data used in the remote control device 10. The CPU 101 executes the program thereby implementing functions shown in FIG. 6 to be described below. The communication IF 105 is an interface that performs communication via a network 90 in accordance with a predetermined communication standard.

Figure 4:
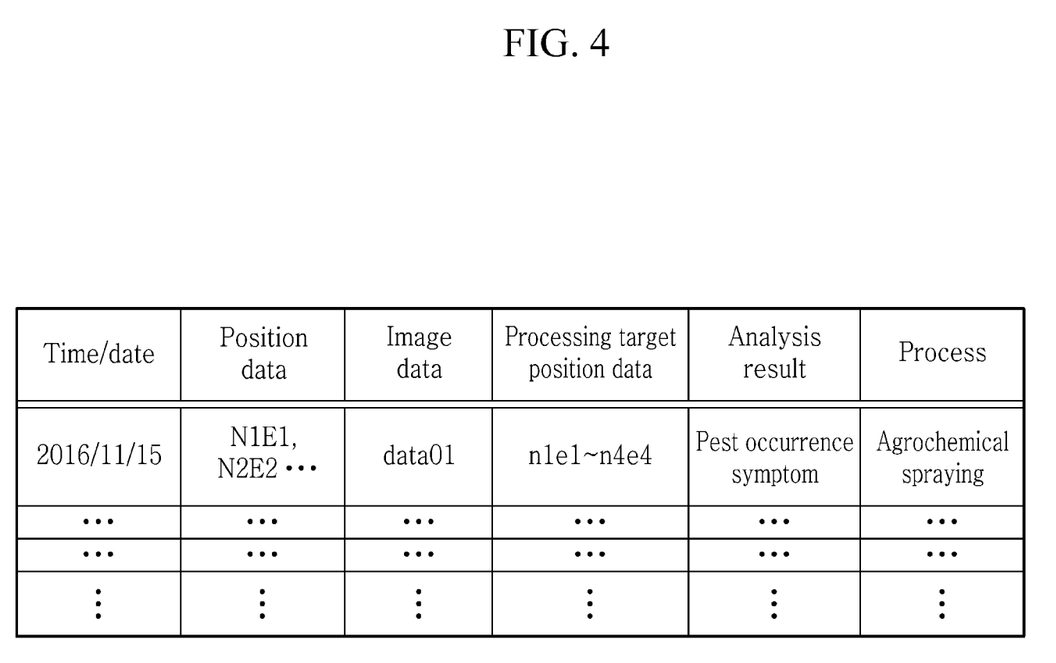
FIG. 4 is a diagram exemplifying information stored in an auxiliary storage device 104 of a remote control device 10.

FIG. 4 is a diagram exemplifying information stored in an auxiliary storage device 104 of a remote control device 10. The auxiliary storage device 104 stores a date and time when an image (here, a moving image) is captured by a moving image-capturing device 10, position data indicating a position at which the image is captured, image data indicating the captured image, and a result of analyzing the captured image, a processing target position data indicating a position of an area in which a process is required as the analyzing result, an analysis result of analyzing the captured image by an image recognition technology, and a content of the required process in association with each other.

Figure 5:
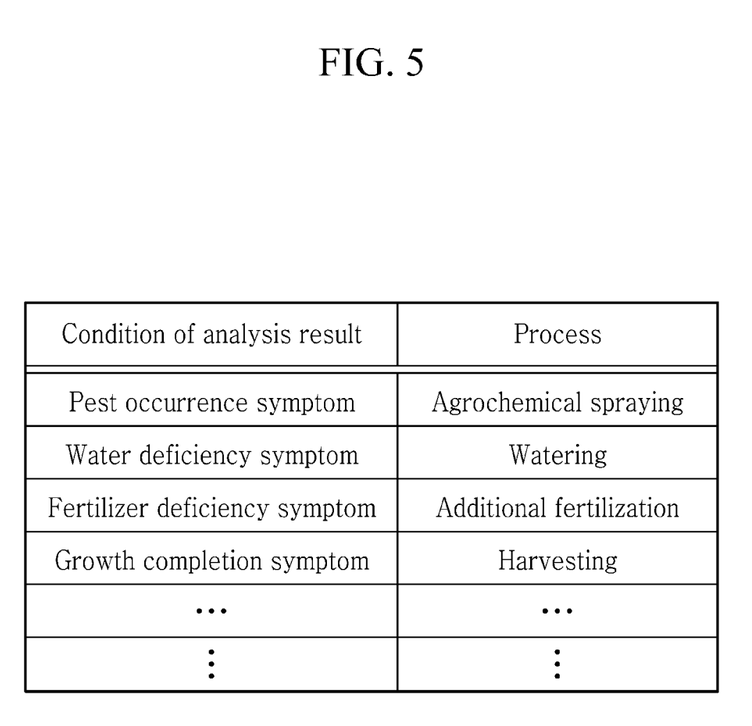
FIG. 5 is a diagram exemplifying a condition process table stored in an auxiliary storage device 104 of a remote control device 10.

FIG. 5 is a diagram exemplifying a condition process table stored in an auxiliary storage device 104 of a remote control device 10. In the condition process table, a condition of an analysis result which is set in advance and is obtained by analyzing the captured image is associated with a process required at a position matching the condition. For example, it is defined in the condition process table that a process such as agrochemical spraying is performed when the shape, color, size or the like of an object (an image object of a plant) included in an image matches the condition of the pest occurrence symptom.

Figure 6:
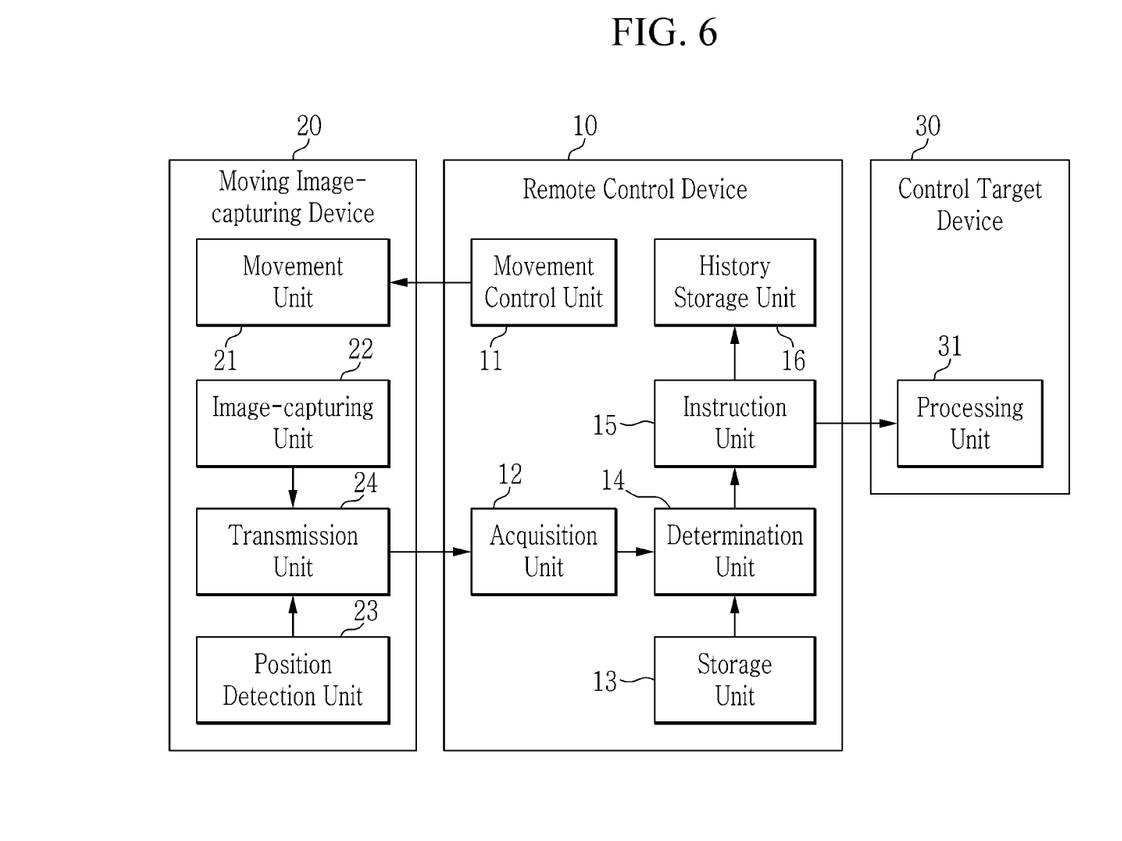
FIG. 6 is a diagram exemplifying a functional configuration of a remote control system 1.

FIG. 6 is a diagram exemplifying a functional configuration of a remote control system 1. The remote control system 1 includes a movement unit 21, an image-capturing unit 22, a position detection unit 23, a transmission unit 24, a movement control unit 11, an acquisition unit 12, a storage unit 13, a determination unit 14, an instruction unit 15, a history storage unit 16, and a processing unit 31. In this example, the movement unit 21, the image-capturing unit 22, the position detection unit 23, and the transmission unit 24 are mounted on a moving image-capturing device 20. The movement control unit 11, the acquisition unit 12, the storage unit 13, the determination unit 14, the instruction unit 15, and the history storage unit 16 are mounted on a remote control device 10, and the processing unit 31 is mounted on a control target device 30.

The movement unit 21 is realized by a rotation mechanism 208 of the moving image-capturing device 20, and the image-capturing unit 22 is realized by a camera 206 of the moving image-capturing device 20. The position detection unit 23 is realized by a positioning device 207 of the moving image-capturing device 20, and the transmission unit 24 is realized by a communication IF 205 of the moving image-capturing device 20. The movement control unit 11 is realized by a CPU 101 and a communication IF 105 of the remote control device 10, and the acquisition unit 12 is realized by the communication IF 105 of the remote control device 10. The storage unit 13 is realized by an auxiliary storage device 104 of the remote control device 10, and the determination unit 14 is realized by the CPU 101 and the auxiliary storage device 104 of the remote control device 10. The instruction unit 15 is realized by the communication IF 105 of the remote control device 10, and the history storage unit 16 is realized by the auxiliary storage device 104 of the remote control device 10.

The movement control unit 11 provides the movement unit 21 with a movement instruction including a movement route, a movement speed, an altitude at moving, and start and end times of image-capturing, in order to control the movement of the moving image-capturing device 20. The movement unit 21 moves the moving image-capturing device 20 in accordance with the movement instruction of the movement control unit 11. The image-capturing unit 25 captures a moving image over a period from the start time to the end time of image-capturing along with the movement of the moving image-capturing device 20. The position detection unit 23 detects a position of the moving image-capturing device 20, that is, a position of the image to be captured. The transmission unit 24 transmits, to the remote control device 10, image data indicating the image captured by the image-capturing unit 22 and position data indicating the position of the image.

The acquisition unit 12 acquires the image data and the position data transmitted from the transmission unit 24. The storage unit 13 stores the above-described condition process table, that is, information in which a condition related to an analysis result of the image data and a process to be performed by the control target device 30 are associated. The determination unit 14 analyzes the image data acquired by the acquisition unit 12, and determines whether the analysis result matches the condition stored in the storage unit 13. When the analysis result of the determination unit 14 matches the condition stored in the storage unit 13, the instruction unit 15 specifies an area to be processed based on the position data acquired by the acquisition unit 12, and instructs the control target device 30 to perform the process associated with the condition in the area. The history storage unit 16 stores, as a process history, the process instructed by the instruction unit 15 and the position of the area in which the process is performed. The processing unit 31 performs the process in accordance with the instruction from the instruction unit 15.

2. OPERATION

Figure 7:
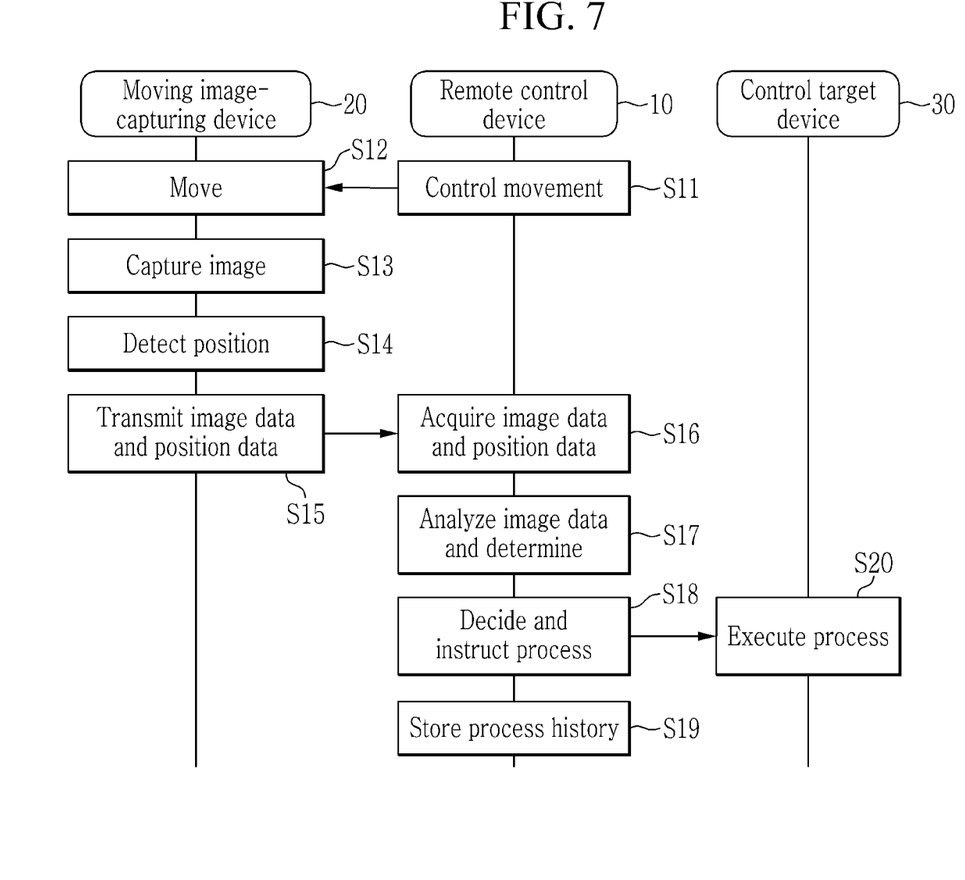
FIG. 7 is a sequence chart exemplifying an operation of a remote control system 1.

FIG. 7 is a sequence chart exemplifying an operation of a remote control system 1. In FIG. 7, a movement control unit 11 of a remote control device 10 provides a movement unit 21 with a movement instruction including a movement route, a movement speed, an altitude at moving, and start and end times of image-capturing via a network 90 (step S11). The movement instruction is prepared in advance by an administrator of the remote control system 1 or the like, and is input to the remote control device 10.

The movement unit 21 of a moving image-capturing device 20 drives a rotation mechanism 208 to move the moving image-capturing device 20 in accordance with the movement instruction of the movement control unit 11. An image-capturing unit 25 captures a moving image over a period from the start time to the end time of image-capturing included in the movement instruction as the moving image-capturing device 20 moves. A position detection unit 23 periodically (for example, every 10 seconds) detects a position of the moving image-capturing device 20, that is, a position of an image to be captured. A transmission unit 24 transmits, to the remote control device 10 via the network 90, image data indicating the image captured by the image-capturing unit 22 and position data indicating the position detected by the position detection unit 23. This transmission processing may be performed after the moving image-capturing device 20 lands on a base facility provided at the flight end point, or may be performed during the flight of the moving image-capturing device 20.

An acquisition unit 12 of the remote control device 10 acquires the image data and the position data transmitted from the transmission unit 24. A determination unit 14 analyzes the image data acquired by the acquisition unit 12. Specifically, the determination unit 14 analyzes the shape, color, size or the like of an object included in each image indicated by the image data by an image recognition technology, and determines whether the analysis result matches any of conditions (pest occurrence symptom, water deficiency symptom, fertilizer deficiency symptom, growth completion symptom, and the like) stored in a storage unit 13.

If there is an image whose analysis result matches the condition stored in the storage unit 13, an instruction unit 15 of the remote control device 10 specifies a position of an area, which is a processing target, based on the position data corresponding to the image. Specifically, the instruction unit 15 sets, as the processing target, an area having a predetermined radius centering on the position data which corresponds to the image whose analysis result matches the condition (pest occurrence symptom, water deficiency symptom, fertilizer deficiency symptom, growth completion symptom, or the like) stored in the storage unit 13. The instruction unit 15 then reads a process (any of agrochemical spraying, watering, additional fertilization, harvesting, and the like) associated with the above condition from the condition process table, and transmits a processing instruction including the processing target position data and its process to the control target device 30 via the network 90. The history storage unit 16 stores, as the process history, the process instructed by the instruction unit 15 and the processing target position data of the area where the process is performed.

The processing unit 31 of the control target device 30 receives the processing instruction from the instruction unit 15. Then, the control target device 30 performs the process included in the processing instruction in the area indicated by the processing target position data included in the processing instruction. Specifically, in a case where the control target device 30 is capable of performing the whole process automatically, the control target device 30 moves to the area indicated by the processing target position data and performs the process. Further, in a case where a human assists or executes at least a part of the process, for example, the human refers to the processing instruction in the control target device 30, moves to the area indicated by the processing target position data, and operates the control target device 30 in the area to perform the process.

According to the present embodiment, it is possible to determine whether or not to perform various processes such as agricultural work without entrusting the determination to the human.

3. MODIFIED EXAMPLES

The present invention is not limited to the above-described embodiments, and various modified examples are possible. Several modified examples are described below. Two or more of the following modified example may be combined for use.

3-1. Modified Example 1

The present invention is applicable to a process of an animal or plant such as laver, fish, shellfish, or the like, which is cultivated in the ocean or river, or a process of an animal such as livestock kept in a ranch, in addition to the plant cultivated in the field.

3-2. Modified Example 2

The movement control unit 11 may control the movement of the moving image-capturing device 20 depending on a type of an animal or plant included in the area to be processed. For example, when it is impossible to analyze the image unless the moving image-capturing device 20 flies at a low altitude depending on the type of animal or plant, the movement control unit 11 controls the movement of the moving image-capturing device 20 to fly at a relatively low altitude. In addition, for example, when it is impossible to analyze the image unless the movement route per unit area of the moving image-capturing device 20 is dense depending on the type of animal or plant, the movement control unit 11 controls the movement of the moving image-capturing device 20 so that the moving image-capturing device 20 flies along a movement route in which the movement route per unit area of the moving image-capturing device 20 is made dense. Further, for example, when it is impossible to analyze the image unless the moving speed of the moving image-capturing device 20 is decreased depending on the type of animal or plant, the movement control unit 11 controls the movement of the moving image-capturing device 20 to fly at a relatively low speed.

Furthermore, in an embodiment, the determination unit 14 analyzes the image to select a necessary process in an embodiment. Instead, for example, a system administrator may first designate a process, and then the determination unit 14 may determine whether or not to perform the designated process by analyzing the image. In this case, the movement control unit 11 may control the movement of the moving image-capturing device 20 in accordance with the designated process. For example, in a case where a process of watering is designated, it is sufficient to analyze the image even if the moving image-capturing device 20 moves quickly at a relatively high altitude since the movement route per unit area is sparse. Accordingly, the movement control unit 11 controls the moving image-capturing device 20 to perform such a movement. On the other hand, for example, in a case where a process of agrochemical spraying is designated, the sufficient image analysis cannot be performed unless the moving image-capturing device 20 moves slowly at a relatively low altitude since the moving route per unit area is dense. Accordingly, the movement control unit 11 controls the moving image-capturing device 20 to perform such a movement.

3-3. Modified Example 3

The control target device 30 and the moving image-capturing device 20 may be the same. That is, the moving image-capturing device 20 may be used as the control target device 30. In this case, the transmission unit 24 of the moving image-capturing device 20 may transmit the image data indicating the image captured by the image-capturing unit 22 and the position data indicating the position detected by the position detection unit 23 during the flight of the moving image-capturing device 20. In response to this, the determination unit 14 immediately analyzes the image data acquired by the acquisition unit 12 and determines whether the analysis result matches the condition stored in the storage unit 13. Then, when the analysis result of the determination unit 14 matches the condition stored in the storage unit 13, the instruction unit 15 instructs the control target device 30 to perform the process associated with the above condition. This processing is performed in real time while the moving image-capturing device 20 is flying.

3-4. Modified Example 4

The area to be processed may be an area that does not include the position at which the image is captured, and may be an area that has a predetermined positional relationship with the position at which the image is captured. For example, when laver is cultivated in the ocean, a sign of occurrence of a red tide or the like may appear on the open sea side of the laver aquaculture area. Therefore, when the moving image-capturing device 20 captures the open sea side of the laver aquaculture area, and moves the facility or sprays an appropriate pesticide for an area where the laver aquaculture facility is located. In this case, the area to be processed is an area that does not include the position at which the image is captured, and corresponds to an area having a predetermined positional relationship with the position at which the image is captured.

3-5. Modified Example 5

The instruction unit 15 determines a process to be instructed to the control target device 30 based on the process history stored by the history storage unit 16. For example, in a case where the agrochemical is again sprayed to an area where the process history indicating that the agrochemical has been sprayed in the past is stored, it is conceivable an example that the instruction unit 15 instructs a process of making an amount of the agrochemical less than the previous time.

3-6. Modified Example 6

The instruction unit 15 may determine a process to be instructed to the control target device 30 based on information (for example, temperature, humidity, or precipitation amount) regarding the natural environment at the position of the image before the time when the moving image-capturing device 20 captures the image. For example, when the precipitation amount is extremely small before the time when the moving image-capturing device 20 captures the image, it is conceivable an example that the instructing unit 15 instructs the process of making the amount of watering in the area to be processed more than the usual time.

3-7. Modified Example 7

The image-capturing device in the present invention is not limited to the moving image-capturing device 20 such as the rotary-wing aircraft exemplified in an embodiment, but may be a device mounted on a vehicle moving on the ground, or may be a device carried by the user, such as a smartphone or a digital camera. Furthermore, the image-capturing device in the present invention does not have to be a movable device, and may be, for example, a fixed device having a camera which faces a known orientation.

3-8. Other Modified Examples

A part of the functional configuration exemplified in FIG. 6 may be omitted. For example, the storage unit 13 may be provided by an external computer device different from the remote control system 1. Further, the function assignment between the remote control device 10 and the moving image-capturing device 20 is not limited to one exemplified in FIG. 6. In an embodiment, some of the functions implemented in the remote control device 10 may be implemented in the moving device 20. For example, some or all of the functions of the determination unit 14 may be implemented in the moving image-capturing device 20. In addition, a computer device group that physically consists of a plurality of devices may function as the remote control device 10 in the remote control system 1.

The programs executed by the CPU 101, the CPU 201, and the like may be provided by a storage medium such as an optical disc, a magnetic disc, or a semiconductor memory, or may be downloaded via a communication line such as the Internet. In addition, the programs may not execute all the steps described in an embodiment.

What is claimed is:

1. A remote control system comprising:
   a communication interface;
   a processor that acquires image data indicating an image captured by an image-capturing device and position data indicating a position of the image through the communication interface; and
   a storage device that stores a condition regarding an analysis result of the image data and a process to be performed by a control target device in association with each other; and
   wherein the processor:
      analyzes the acquired image data and determines whether the analysis result matches the stored condition; and
      when the analysis result matches the stored condition, instructs, through the communication interface, the control target device to perform the process associated with the condition in an area based on the acquired position data.

2. The remote control system according to claim 1, wherein the image-capturing device is a moving device that is movable.

3. The remote control system according to claim 2, wherein the processor controls movement of the image-capturing device through the communication interface.

4. The remote control system according to claim 3, wherein the processor controls the movement of the image-capturing device in accordance with a type of an animal or plant included in the area where the process is performed.

5. The remote control system according to claim 3, wherein the processor controls the movement of the image-capturing device in accordance with the process, and
   wherein the processor determines whether the analysis result matches the condition that is stored in association with the process.

6. The remote control system according to claim 2, wherein the control target device is the moving device.

7. The remote control system according to claim 1, wherein the area based on the acquired position data is an area that does not include the position indicated by the position data, and is an area having a predetermined positional relationship with the position indicated by the position data.

8. The remote control system according to claim 1, wherein the storage device stores, as a process history, the instructed process and the area where the process has been performed,
   wherein the processor determines a process to be instructed to the control target device based on the stored processing history.

9. The remote control system according to claim 1, wherein the processor determines a process to be instructed to the control target device based on information related to a natural environment at the position of the image before a time when the image is captured.

10. A remote control method comprising:
    acquiring image data indicating an image captured by an image-capturing device and position data indicating a position of the image;
    in a storage device that stores a condition regarding an analysis result of the image data and a process to be performed by a control target device in association with each other, determining whether an analysis result of the acquired image data matches the stored condition; and
    when the analysis result matches the stored condition, instructing the control target device to perform the process associated with the condition in an area based on the acquired position data.

11. A non-transitory computer-readable medium that stores a program for causing one or more computers to execute:
    acquiring image data indicating an image captured by an image-capturing device and position data indicating a position of the image;
    in a storage device that stores a condition regarding an analysis result of the image data and a process to be performed by a control target device in association with each other, determining whether an analysis result of the acquired image data matches the stored condition; and
    when the analysis result matches the stored condition, instructing the control target device to perform the process associated with the condition in an area based on the acquired position data.

* * * * *